Dec. 30, 1930.   O. R. SCHOENROCK   1,786,871
OVER TIRE FOR LUGGED TRACTION WHEELS
Filed Feb. 19, 1927
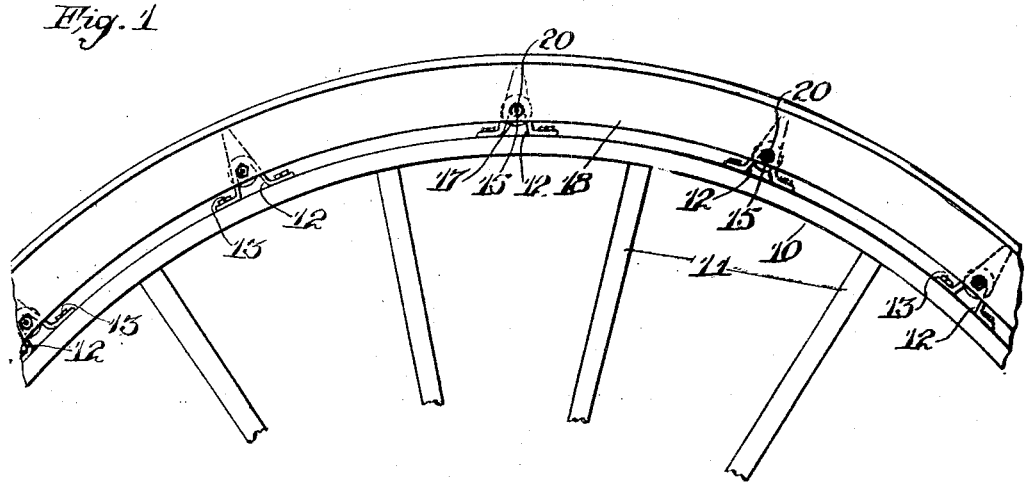
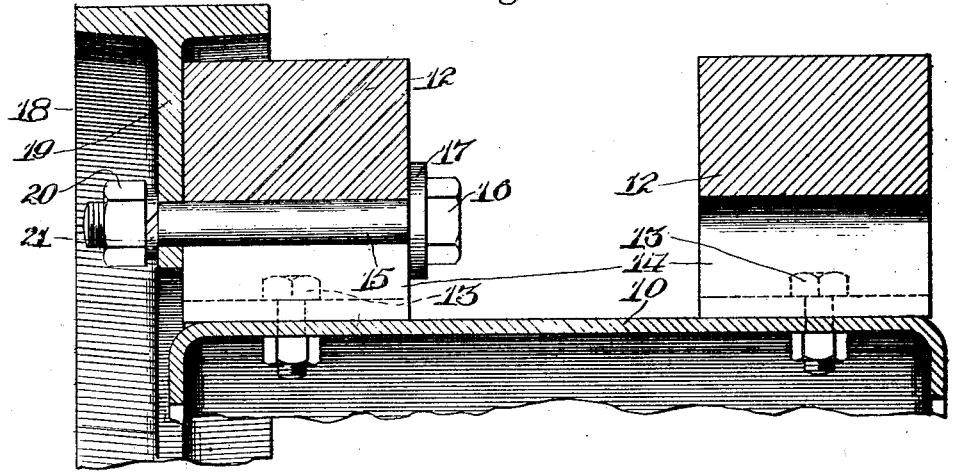
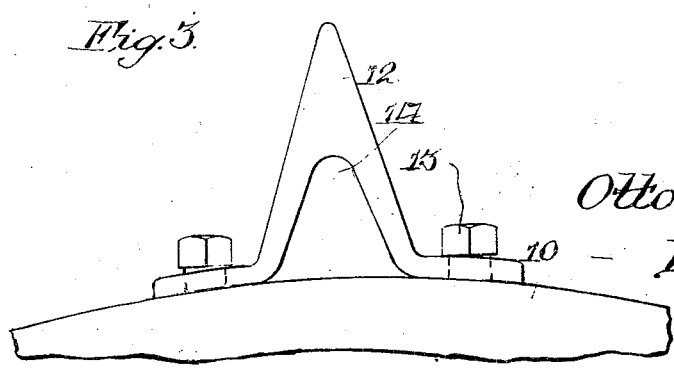
Inventor
Otto R. Schoenrock Patented Dec. 30, 1930

1,786,871

UNITED STATES PATENT OFFICE

OTTO ROBERT SCHOENROCK, OF CHICAGO, ILLINOIS, ASSIGNOR TO INTERNATIONAL HARVESTER COMPANY, A CORPORATION OF NEW JERSEY

OVERTIRE FOR LUGGED TRACTION WHEELS

Application filed February 19, 1927. Serial No. 169,451.

This invention relates to traction wheels, and particularly to an over-tire for such wheels having traction lugs.

Tractors and similar vehicles having traction wheels when used for field work, have their wheels provided with traction lugs, to prevent wheel slippage and to increase the tractive effort of such wheels. Traction wheels, so equipped, of course, cannot be run on hard surfaced or other roads, without causing damage to the road surface. Accordingly, it is desirable to have an over-tire attachment for lugged traction wheels, which may be easily attached to the wheel, for the purpose of protecting road surfaces from the destructive action of the lugs. Such over-tires would additionally be useful in field work, to prevent the wheels from sinking too deeply in soft ground.

Accordingly, the objects of this invention are generally to improve over-tire attachments for lugged traction wheels; to provide such an attachment for a particular kind of lug; to provide a simple and efficient attaching means for such an over-tire; and, lastly, to provide a simple over-tire and attaching means therefor, which will be simple to manufacture at low cost and which will meet the exacting requirements of hard, practicable usage.

Briefly, these desirable objects are accomplished in a traction wheel combination, with the wheel having spaced lugs each provided with a channel on its under side, said channels adapted to receive attaching means for mounting an angularly shaped over-tire on said lugs; or, differently expressed, the objects are achieved in the provision of an over-tire attachment for lugged wheels, said attachment comprising an over-tire having a flange adapted to be secured to certain or all of the lugs, by attaching means passing into or thru the lugs.

In the accompanying sheet of drawings there has been shown an illustrative embodiment, which the invention may assume in practice; and, in these drawings:

Figure 1 is a side elevational view of a quadrantal section of a traction wheel, showing the improved over-tire and attaching means in association with the lug structure;

Figure 2 is an enlarged, transverse sectional view thru the wheel, lugs and over-tire; and Figure 3 is an end detail view of one of the lugs to which the over-tire is secured.

A portion of a traction wheel has been shown, said wheel having a flat tire 10, and spokes are generally indicated at 11.

Lugs 12, generally including an inverted V and having a solid ridge portion as shown are secured by bolts 13 at spaced intervals along the wheel tire, as shown. Each of these lugs has a groove or channel on its under side 14 formed as an incident in manufacture, and to save material, and lighten weight.

With such lugs, the wheel cannot be run on hard or other roads without damaging the road surface. And in the field, where the ground is soft, the wheel is apt to sink too far and lessen the tractive effort thereof. Accordingly, it is desirable to provide an over-tire for the wheel which will protect road surfaces from the lugs, and which, in soft ground, will prevent the wheel from sinking too far.

For this purpose, the groove or channel 14 in each lug is conveniently brought into play, as they are each adapted to receive a bolt 15 having a head 16 and washer 17, with a threaded end projecting beyond the outer end of the lug, as shown. It can now be seen that an over-tire 18, having an angularly related flange 19, can be laid against the outer edge of the circular series of spaced lugs 12 in such a manner that apertures in the tire flange 19 may be registered with the extending or projecting ends of the bolts 15, as shown in Figure 2. Nuts 20 are used with split spring washers 21 to secure the over-tire, as is obvious.

The over-tire in the preferred embodiment will be T-shaped, as shown, but obviously it may, in practice, be an ordinary angle bar, or any other shape, which embodies an angularly related flange portion adapted for attachment to the lug ends.

Similarly, the lugs can be as shown in Figure 2; that is, they need not extend the width of the wheel tire. Or, they may be as wide as the tire. Likewise, in the embodiment illustrated, two over-tires may be used. Furthermore, the flange of the over-tire may be attached to all of the lugs, or just to certain of the lugs. Again, it is immaterial whether the over-tire be a continuous or a split ring. Furthermore, it is not essential that the bolts pass completely thru the lugs in securing the overtire thereto, for obviously it is possible to tap the solid ridge portion of each lug so that short bolts could be threaded thereinto and pass only part way into the lugs.

In practice, it will be a simple matter to attach and detach the over-tire of this invention by means of the bolts, as will be obvious.

It is the intention herein to cover all such changes and modifications as do not materially depart from the spirit and scope of this invention, as appears from the subjoined claims.

What is claimed as new is:

1. In combination with a wheel tire carrying V-shaped lugs, each of said lugs being arranged transversely of the rim and provided with a transverse channel, of a T-bar overtire for the lugs, in which the leg flange of the T-bar lies flatly against the outer face of the lugs, while the head flange of the T-bar overhangs the lugs and extends laterally beyond the said outer face of the lugs, and fastening means passed through the channel of certain of the lugs and through the leg flange of the T-bar.

2. In combination with a wheel tire carrying V-shaped lugs, each of said lugs being arranged transversely of the rim and provided with a transverse channel, of an overtire for the lugs, said overtire having a leg flange lying flatly against an end face of the lugs and an angularly disposed head flange serving as the tire portion, and fastening means passed through certain of the lug channels and through the leg flange to secure the overtire to the lugs.

In testimony whereof I affix my signature.

OTTO ROBERT SCHOENROCK.